Sept. 10, 1968   R. R. McCORNACK   3,400,731
FLUID VALVE WITH SELF-CLEANING METERING ORIFICE
Filed May 9, 1966   2 Sheets-Sheet 1
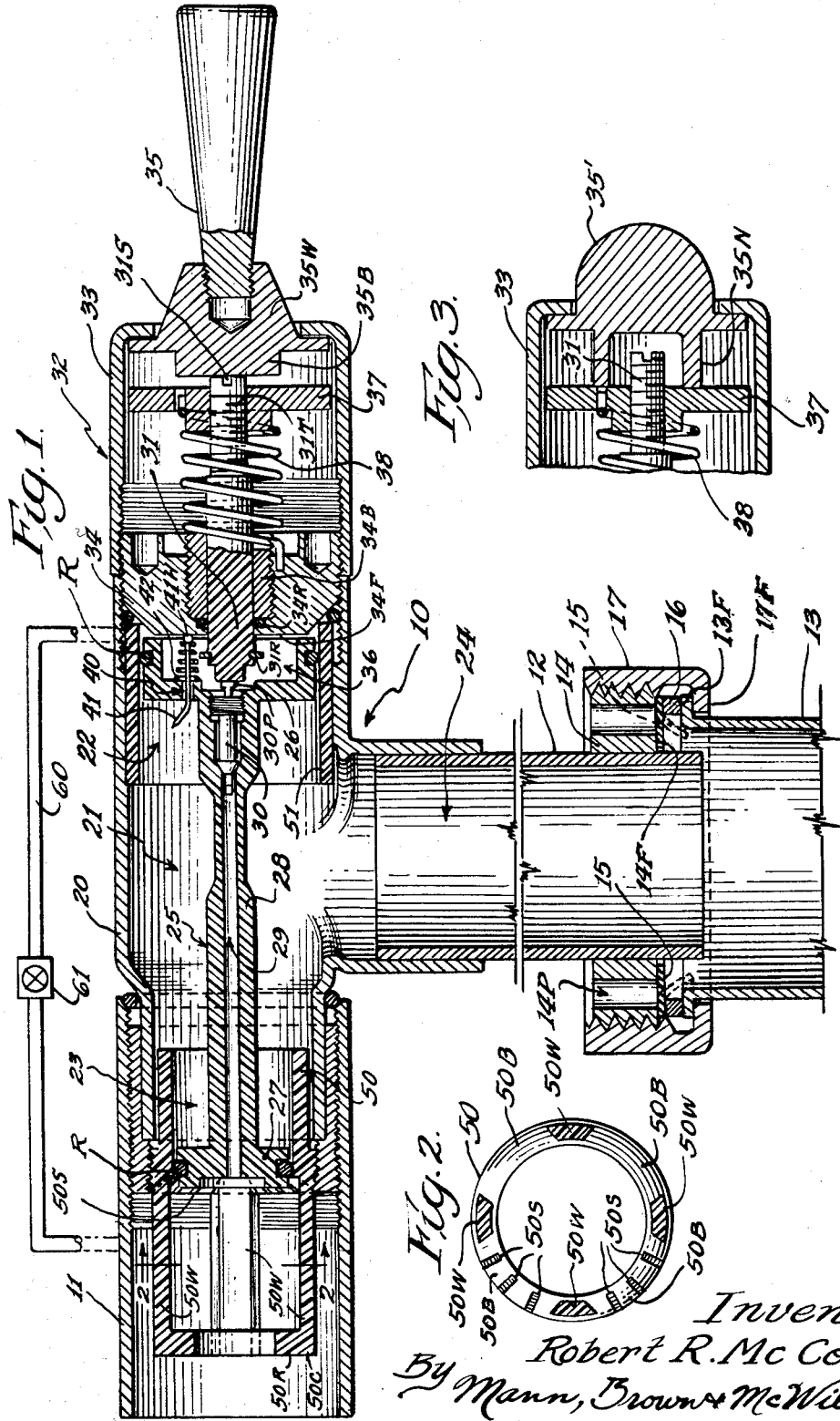
Inventor
Robert R. McCornack
By Mann, Brown & McWilliams.
Attys.

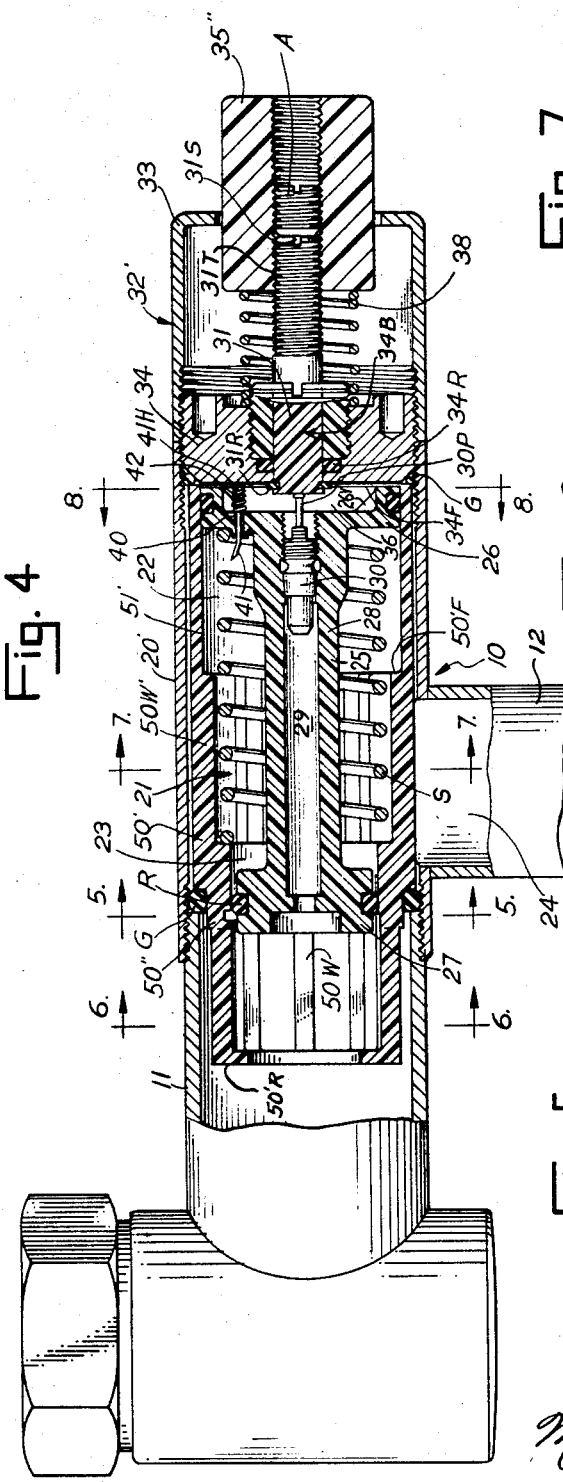

United States Patent Office 3,400,731
Patented Sept. 10, 1968

3,400,731
FLUID VALVE WITH SELF-CLEANING
METERING ORIFICE
Robert R. McCornack, 980 N. Broad St.,
Galesburg, Ill. 61401
Continuation-in-part of application Ser. No. 311,466,
Sept. 25, 1963. This application May 9, 1966, Ser.
No. 592,702
16 Claims. (Cl. 137—245)

ABSTRACT OF THE DISCLOSURE

This invention is directed to a hydraulic flushometer valve having an adjustable replaceable plastic unit mechanism wherein the pressure chamber is exhausted past a movable pin in a self-cleaning orifice, and the main valve head is modified to eliminated water hammer.

This application is a continuation-in-part of my copending application Ser. No. 311,466, filed Sept. 25, 1963, and now abandoned.

This invention relates to a flush or fluid valve, and more particularly, is concerned with a flush valve construction suitable for metering water or other liquids through a smooth cycle of valve opening and closing movements.

The flush valve art is, in general, old and highly developed but many constructions in current use are unduly expensive, limited and difficult in adjustment, and subject to excessive mechanical damage.

The principal object of the invention is the provision of an improved fluid valve that solves these problems.

Another object of the invention is to provide a valve which reduces fluid shock to fluid systems during opening and closure.

Another object of the invention is the provision of a flush valve construction employing standarized parts capable of low-cost manufacture.

Another object of the invention is the provision of a flush valve construction having a readily replaceable cartridge-type valving element.

Still another object of the invention is the provision of a flush valve construction having facilities simplifying adjustment over a wide range of the stroke and flow interval thereof.

A further object of the invention is the provision of a flush valve construction that facilitates manual actuation without being subject to excessive mechanical damage by vandalism.

Generally speaking, in its preferred form, the invention utilizes a novel form of double-ended differential area one piece plastic piston valve having large and small heads at opposite ends and equipped with peripheral O-ring seal elements for sealingly slidable cooperation within plastic cylinders of unitary construction. A novel self-cleaning bleed passage or orifice regulates valve closure speed and thereby determines metered flow through the valve in accordance with the selected valve stroke length. The piston valve has a hollow open-ended stem providing an elongated flow passage that is equipped with a conventional valve core. The seal or piston at the inlet to the flush valve has provision for eliminating vibration during final valve closure. Movement of the piston valve is accurately guided at all stages and during the opening cycle is induced by unbalanced upstream pressure and during the closing cycle is induced principally by unbalanced downstream pressure acting thereon.

Other objects and advantages of the invention will become apparent as the description proceeds.

In the accompanying drawings forming a part of this specification, and in which like numerals are employed to designate like parts throughout the same, FIGURE 1 is a lengthwise sectional view through one flush valve construction illustrating the parts thereof in normal closed position;

FIGURE 2 is a fragmentary sectional view taken on the line 2—2 of FIGURE 1;

FIGURE 3 is a fragmentary sectional view showing an alternative form of actuator assembly that may be utilized with any of the disclosed valve constructions;

FIGURE 4 is a lengthwise sectional view through a preferred valve construction illustrating the parts thereof in normal closed position;

FIGURE 5 is a fragmentary sectional view taken on the line 5—5 of FIGURE 4;

FIGURE 6 is a fragmentary sectional view taken on the line 6—6 of FIGURE 4;

FIGURE 7 is a fragmentary sectional view taken on the line 7—7 of FIGURE 4;

FIGURE 8 is a fragmentary sectional view taken on the line 8—8 of FIGURE 4; and

FIGURE 9 is a fragmentary sectional view of an alternative form of piston head at the inlet of the valve.

Referring now to FIGURES 1, 2 and 3, one form of flush valve illustrated is designated generally at 10 and is of the type commonly employed for controlling the supply of water to toilets and related facilities having similar flushing requirements. In a typical installation, the flush valve 10 has an inlet connector sleeve 11 arranged for open connection to a water supply main at which a determinable water pressure is normally maintained, and the valve has an outlet connection sleeve 12 connected to the inlet conduit 13 of a flushing device such as a toilet.

In accordance with normal practice, the joint between the outlet connection sleeve 12 and the inlet conduit 13 is equipped with a syphon breaking flapper valve construction. Accordingly, the pipe 12 which serves as the outlet connection sleeve is equipped with an end collar 14 fastened to the pipe in encircling relation thereto and provided with vertical through passages 14P opening through a collar end face 14F that preferably is spaced above the plane of the pipe end. An annular washer 15 of flexible rubber-like material is disposed in end-wise abutting engagement with the collar end face 14F to overlie and normally block the collar passages 14P. The adjacent upper end of the inlet conduit 13 has an external edge flange 13F serving as a seat for a seal ring gasket 16 that is to be compressed endwise against an outer peripheral portion of the main washer 15. A clamping ring 17 threadedly engages the collar 14 and has an end flange 17F underlying the conduit flange 13F to draw the same against the gasket 16 and washer 15 and complete the seal.

During a normal flushing operation, water or any other suitable liquid may pass through the inlet connection sleeve 11 and through the flush valve 10 to discharge through the outlet pipe 12. This discharging action exerts a Venturi-effect drawing air through the passages 14P and aerating the water being discharged. In the event of the establishment of suction conditions in the supply system to the flush valve 10, the tendency for suction to develop in the outlet pipe 12 induces a flapper action of the inner peripheral portions of the main washer 15 and correspondingly uncovers the collar passages 14P to admit suction relieving air from the outside atmosphere. To enhance this flapper action, the wall of the washer 15 is of substantially greater dimension radially than vertically.

In one embodiment illustrated herein, the flush valve 10 incorporates a main valve body element 20 in the form of a wrought copper T providing a valve chamber of generally T-shaped configuration and having a main flow space or chamber 21 centrally therein, a metering passage or piston chamber 22 extending from the main flow space on one side thereof, an inlet passage or piston chamber 23 leading into the main flow space on an opposite side thereof, and being smaller in cross-section than and aligned lengthwise with the metering passage 22, and an outlet passage 24 extending sidewise from the main flow space at a location intermediately of the metering and inlet passages.

A double-ended differential area piston valve 25 is disposed within the T-shaped valve body and includes a large head or piston 26 at one end arranged in sealingly movable relation within the metering passage 22, a small head or piston 27 at its opposite end arranged for sealingly movable relation at the inlet or entry region of the inlet passage 23, and a hollow open-ended stem or conduit 28 extending through the main flow space and rigidly interconnecting the heads 26 and 27, with the stem 28 providing an elongated flow passage 29 through the piston valve for establishing communication between the inlet region or first piston chamber of the inlet passage 23 and the metering passage or second piston chamber 22.

A valve structure 30 is carried in the stem or conduit of the piston valve and is provided with normally closed valving facilities disposed in flow blocking relation in the elongated flow passage 29 of the stem and exposed through the large head 26 thereof for engagement and actuation by positive mechanical means to unblock the stem flow passage for initiating a cycle of operation of the valve. This valve structure preferably comprises a valve core of the type commonly employed on automobile tires which is disposed in a widened mouth region of the stem passage and which includes an opening means or actuator pin 30P projecting through the end of the piston for convenient engagement by a shiftable rod element 31.

The rod element 31 is incorporated in an actuator assembly 32 that is provided for the flush valve and that includes an end cap 33 fixed on the valve body 20 to span the outer end of the metering passage 22. The actuator assembly 32 includes an internal collar 34 threadedly engaged to the copper T to establish a seal for the metering passage and threadedly receiving the end cap 33 to support a handle mechanism 35 that is carried therein. The collar 34 presents an internal abutment face 34F to engage the large head 26 of the piston valve and determine its normal limit position.

Bleed passage facilities or metering orifice 40 are provided through the large head 26 to establish a controlled release of liquid from the second cylinder or enclosed chamber 36 that is defined conjointly between the collar 34 and the large head 26 of the piston valve.

Referring specifically to FIGURES 4–8, inclusive, a preferred construction is illustrated wherein a simple straight wall T valve body 20' has inserted therein a unitary sleeve-like member 50' which has a forward open-sided, open-ended cylinder portion formed by web members 50W and collar 50'', web members 50W' spanning main fluid chamber 21 and a second closed-sided, open-ended cylinder portion 51'. For purposes of structural rigidity and to provide accurate guidance of head 27, eight web members 50W may be employed it is obvious that four, six or other number may be employed as long as sufficient open space is provided to allow fluid flow to take place between the inlet end of the valve to the main fluid chamber when head or piston 27 is unseated. Obviously the same basic criteria would be true for web members 50W'. An interior flange 50'F is provided on the forward portion 51 to limit the movement of head 26 therethrough. Ring portion 50'R may also coact with flange 50'F to limit axial movement of the entire valving structure.

It is at once apparent that the O-ring on head 26 and the wall of portion 51' coact to form a running seat along the entire length of portion 51'. Desirably, but not necessarily, a spring S is provided in encircling engagement of the stem or conduit 25 biasing the piston 27 into a seating position. This feature makes it impossible to insert a replacement valve cartridge into the valve body in the open or unseated position. O-ring elements or gaskets G form fluid tight seals between the valve body 20', the inlet conduit 11 and actuator assembly 32'. Push button 35'' is similar to the actuating mechanism depicted in FIGURE 3 with the exception that the stroke adjustment of rod 31 is more readily attained and screw A provides an anti-vandalism means to prevent unauthorized adjustment of stroke length.

Preferably the rearward recessed surface of piston 26 is provided with a series of spaced fin or rib-like projections constituting vanes 26V to impart a turbulence to fluid entering the chamber rearward of head 26 towards orifice or bleed passage facilities 40 thereby tending to rotate spring 42 and thus captive pin 41 to keep bleeder orifice 40 clean and free of sediment particles.

One particular noteworthy feature in conjunction with the one piece or cartridge valving unit is that the unit is laterally shiftable within the valve body. That is it may occupy a variety of fore and aft positions depending on the radial position of the connector sleeve 11 and the distance that the valve body is threadably advanced. Thus the valve body may occupy any position within a 360° arc and because the valve unit is laterally shiftable and because of the adjustability of internal collar 34 the connection will always be fluid tight because of the urging of member 50' against the forward O-ring or gasket G and the urging of collar 34 against the rear O-ring or gasket G.

General operation

The general operation of the flush valve may now be described bearing in mind that the structures disclosed in FIGURES 1 and 4 operate in a similar fashion and that fluid under pressure is assumed normally to be present and acting to enter the valve through the inlet connector sleeve 11 to flow through the main flow space 21 and out the outlet passage 24. The mechanism 35 is actuated to impart a predetermined axial stroke to the rod 31 which engages the opening means or actuator pin 30P of the valve core for unblocking the stem or conduit flow passage 29. This allows fluid under pressure to flow through the stem flow passage 29 and enter the enclosed chamber 36 to act upon the larger surface presented by the large head of the piston valve. Due to the differential area relationship of the piston valve and the pressure drop through the main flow space 21, resultant upstream fluid pressure predominates and the piston valve 25 is caused to move in an upstream direction or towards the left as viewed in FIGURE 1 or FIGURE 4. This upstream shifting movement of the piston valve 25 generates a stroke corresponding to the length of the time the actuating mechanism is operated for the predominance of the upstream fluid pressure exists only so long as the valve core 30 is held open by the shiftable rod 31.

It should be understood that while the bleed passage facilities 40 allow leakage of fluid from the enclosed chamber 36 back to the main flow space 21 during the opening stroke, the area and hence the flow through the bleed passage is markedly lower than that which is permitted through the valve stem 28 so that the described upstream pressure differential is actually achieved. As soon as the upstream movement of the piston valve 25 unseats the small head 27 that normally blocks the inlet to the flush valve, full flow is permitted through the inlet passage 23 and through the main flow space 21 to the outlet connector sleeve. Normally, the actuating mechanism 35 is operated momentarily to generate the full opening stroke almost instantaneously, whereas, the return stroke is substantially slower and determines the full cycle time and hence the flow capacity of the valve.

The return stroke is initiated upon release of the actuating mechanism and consequent retraction of the rod 31 to enable automatic closure of the valve core 30 and eliminate pressure acting upstream upon the large head 26 of the piston valve. At this point, upstream pressure action upon the piston 27 predominates, acting to return it at a rate governed by the bleed flow of the fluid trapped in the enclosed chamber 36. As the return stroke proceeds, the small head 27 of the piston valve moves into and seals at the entry region of the inlet passage 23 until motion is prevented by engagement of the large head with the abutment collar.

*Particular features*

One of the features of this invention is the provision of sliding seals for the piston valve heads 26 and 27. An effective low-cost construction incorporating such an arrangement of sliding seals results from the use of the wrought copper T or a conventional straight wall T as the valve body 20 and while this wrought copper T is capable of providing requisite passage wall configurations, it is preferred for the purposes of a flush valve handling water or similar liquids to use cylindrical sleeve inserts 50 and 51 or unitary sleeve 51' for placement within the opposite arm portions of the T to provide therein the inlet passage 23 and the metering passage 22. The inserts 50 and 51 or 51' are low absorptive and may be of any suitable material but preferably are a plastic material such as is marketed under the trade names "Merlon" and "Delrin" as this is substantially nonwater absorptive. Each head 26 and 27 of the piston valve has a peripheral groove equipped with an O-ring R of a synthetic rubber or natural rubber, all generally designated as rubber-like.

Correspondingly, the piston valve 25 is preferably a one-piece unit of a plastic or other suitable material that is also low water absorptive and with this arrangement in a flush valve handling water and the like, the water acts as a lubricant both for the synthetic rubber of the O-rings R and for the plastic of the sleeve inserts 50 and 51 or unitary sleeve 51' and the piston valve 25. Thus, an effective sliding seal is achieved and enables the unit to develop a smooth movement during its operating cycle.

While generally the pressure of the fluid alone will function to open the valve it may be desirable to obtain an assist from the shiftable rod 31. Convenient adjustment of stroke length and hence of cycle may be important as flush valves must be applied under widely varying conditions of system pressures and flow capacities and must be capable of adjustment to enable adequate flow under the various conditions. In the flush valve construction depicted in FIGURES 1-3, adjustment of the stroke length imparted to the rod 31 by the handle 35 is quite convenient. The collar 34 through which the rod 31 is shiftable axially is equipped with an insert bearing sleeve 34B and a captive O-ring 34R of rubber-like material to guide and seal the rod 31 during its movement cycle.

Accordingly, the rod 31 is also preferably of a low water absorptive type of plastic material and it projects endwise beyond the outer face of the abutment collar and has an externally threaded outer end 31T to receive a push plate 37 in threaded connection. A helical return spring 38 encircles the rod 31 and has one end anchored against rotation in the stop collar 34 and the other end anchored against rotation in the push plate 37 to prevent the possibility of accidental rotation of the push plate 37 with respect to the rod which is, itself, held against rotation by the captive O-ring 34R provided within the stop collar.

In the form depicted in FIGURE 1, the handle 35 includes a wobble plate 35W having a circular central boss 35B normally abutting the rod end 31T but of substantially larger diameter. There is advantage in employing the circular boss 35B on the wobble plate 35W, as distinguished from a full flat-faced wobble plate, as the initial point of contact of the wobble plate 35W with the push plate 37 is then closer to the center of the rod 31 and less bending moment is applied to the rod at the beginning of the stroke when the rod is at maximum extension and hence most subject to bending. The rod 31, when of plastic, is not intended to withstand severe bending moments. A full width parti-spherical convex face may be employed on the wobble plate in place of the boss 35B for similar results.

The wobbling motion imparted by the handle 35 engages the wobble plate 35W directly against the push plate 37 and shifts it and correspondingly the rod 31 inwardly to generate a stroke the length of which is determined by the relative axial position of the push plate 37 along the rod 31. Thus, stroke length is adjustable by rotating the rod 31 relative to the push plate 37 to vary the axial relationship of these parts. Access as by means of a screwdriver to a rod end slot 31S for this purpose is obtained by backing off the end cap 33 from the stop collar 34. A snap ring 31R on the inner end of the rod prevents escape of the rod during this adjustment procedure. The embodiment depicted in FIGURE 4 is of similar construction and operation which because of its obvious function will not be described, it being understood that the actuating mechanisms are interchangeable with respect to the two specific constructions disclosed.

Another valuable feature of this invention resides in the provision of a self-cleaning orifice construction for the bleed passage facilities 40. Accordingly, the large head 26 of the piston valve is provided with a hole opening therethrough and a captive pin 41 having a bent end extends loosely through the hole to enable limited twisting and shifting movement of the pin within the hole. Because it is preferred to have a small metering or bleed orifice and the fact that it is difficult to drill or mold an orifice in the piston or head 26 of the desired diameter, a larger orifice within which a precision drilled orifice-containing plug is inserted provides the accuracy desired. Preferably the plug protrudes a short distance into the main fluid chamber (FIGURE 4) so that the captive pin will not erode the bleeder passageway or permit the concentration of stress forces at a specific point on the captive pin. While it is contemplated that normal fluid flow induced during valve operation acting upon the bent portion of the pin will produce such movement of the captive pin 41 and maintain a cleaning action at the orifice, it is preferred to provide a coil spring 42 reacting between the piston head 26 and an integral head 41H on the pin to urge the pin towards the stop collar 34 whenever the piston valve is spaced from the stop collar and to act as a filter to prevent deposition of sediment around the orifice. The pin 41 is returned by engagement with the stop collar 34 during the return stroke of the piston valve. This cycle movement positively cleans the orifice during each operating stroke. To keep the possibility of the bleeder facilities becoming blocked to a minimum, a stainless steel captive pin is preferred since it is relatively non-corrodable by such fluids as water.

It will be noted that the large head 26 of the piston valve has an endwise outwardly directed cup-shaped configuration to provide the enclosed chamber 36 with a minimum initial size and facilitate the inflow and spreading of the fluid that creates the upstream pressure providing the opening stroke of the piston valve 25. This cup-shaped configuration for the large head of the piston provides a convenient mounting pocket for the self-cleaning captive pin 41.

To provide an effective guiding action for the slidable piston valve, the sleeve insert 50 or forward portion of sleeve 50' that defines the inlet passage 23 has a skeletal cage portion projecting axially outwardly of the inlet passage 23 to maintain the alignment of the small head 27 of the piston valve after it moves free of its sealing contact with the inner unbroken wall portion of the insert sleeve 50 or collar 50''. The skeletal cage portion includes an end ring 50R and a set of lengthwise webs 50W or 50W' that joint integrally to the sleeve 50 or callar 50" respectively. Equivalent guiding action could be obtained by eliminating the cage portion and establishing a spider-like formation on the stem 28 to contact portions of the insert sleeve constituting inner regions of the inlet passage.

Another feature of the invention provides for eliminating the vibration and objectionable noise frequently associated with the turbulence effect occurring at the instant when the small head 27 of the piston valve begins to seat in sealing relation within the insert sleeve 50 or collar 50". Beveled arcuate seal faces 50B or 50B' are defined between the guide webs 50W or 50W' respectively. As the O-ring R carried on the small head initiates seal closure with these beveled face portions 50B or 50B', there is inherently a tendency for violent turbulence in the flow at cut-off. Dampener slots 50S or a single slot 50S' are provided in certain of these beveled faces to create irregular surface paths having an unbalanced configuration so that final flow occurs through these surface paths and enables the development of a biasing action due to flow pressures exerting lateral loading upon the small head 27 of the piston valve to maintain it towards one side and thereby oppose any tendency for side to side vibration. As illustrated, one dampener slot 50S' or six dampener slots 50S are arranged around one semi-circular region of the seal face entry region and this effects a properly distributed lateral loading to prevent the objectionable chattering at closure. It is, of course, obvious that the seal face 50B or 50B' need not be slotted or have a recessed portion at all. In this case the unbalanced flow condition may be obtained by providing a beveled slot or recess in the surface of the piston head 27 adjacent the main fluid chamber as illustrated in FIGURE 9. It will of course be obvious that no slots be provided in either the seat or piston head in that an unbalanced condition may be obtained by having the first piston head form an oblique angle rather than a right angle with the seat.

While the details of the invention have been disclosed herein in relation to a flush valve for use with water systems such as toilets, it should be understood that the valve may be used with other liquid metering installations. Moreover, many principles of the invention are applicable to fluid metering devices of a more general character. Various of the details of construction may be eliminated or replaced by equivalent structures where the requirements of the particular application permit.

The device was developed for application in the control of flush water to toilets, urinals, and similar structures. It is also useful in lavatories of industrial and institutional establishments wherein one valve for controlling flow of hot water and one valve for controlling flow of cold water may be provided to each lavatory washbowl. Similar applications to metering the flow of fluids are contemplated; for example, it may serve as a metering valve for supplying flow to shower heads wherein the time cycle would be chosen long enough to suit the needs of such an application and wherein there would be the advantage that one could not leave the water running. Similarly, the device may be employed in processes where it is necessary to meter a predetermined quantity of any compatible liquid. Chemical applications frequently require such devices. While these various applications employ different terminology, it is intended that the term "flush valve" as used herein shall encompass any of these applications whether primarily known as flushing applications or as metering applications.

While in one preferred form, the piston valve is disclosed with a large head in the metering passage and a small head in the inlet passage, it should be understood that this differential area arrangement causes the pressure conditions of the fluid being handled to provide the opening stroke of the piston valve but that this arrangement would not be necessary where, due to the power capable of being applied through the actuator, or due to the low pressure conditions within a particular system, such function is not desired. Thus, a piston valve having heads of equal size may be employed where circumstances do not require the opening function that can be obtained by the differential area relationship. In fact, the head sizes may even be reversed so that the internal pressure tends to resist the opening stroke imparted to the actuator. While these alternatives are contemplated, there is important advantage in the preferred differential area arrangement as disclosed herein.

To illustrate the representative versatility of the present valve arrangement, there is diagrammatically illustrated in FIGURE 1 a bleed line 60 leading from the enclosed chamber 36 to the interior of sleeve 11 and equipped with a manual on-off flow valve 61. The valve, when equipped with such a bleed line, may serve in a system where the valve is normally open but may be tripped manually or otherwise to effect automatic shut-off. In such installation, the sleeve 12 would be connected to input and the sleeve 11 would serve as discharge. Under normal conditions, in such an installation, the piston valve 25 would be open and continuous flow would occur from passage 24 to the flow space 21 and out through passage 23. Under these conditions, chamber 36 would be fully expanded and filled with liquid by virtue of leakage through the bleed passage facilities 40. To effect shut-off, the valve 61 in bleed line 60 may be open and if bleed line 60 is large enough to allow greater flow than is capable of leaking through passage 40, chamber 36 will contract and the valve 25 will move to passage closing position.

It should also be noted that the particular flush valve lends itself to other types of actuation, the wobble plate handle 35 may be replaced by a push button type of handle 35 or 35" for actuating the push plate 37 and one feature of the invention is its adaptability for use with a push button mechanism. A push button device is illustrated in FIGURE 3 and has an annular nose 35N for engagement with the push plate 37 and providing a hollow cavity to enable various positions of adjustment of the push plate with respect to the rod 31. The push button device of FIGURE 4 does not necessitate the push plate 37 in that actuating of the button 35" directly engages the rod 31.

Thus, while specific embodiments of the invention have been illustrated herein, it is to be understood that changes and variations may be made by those skilled in the art without departing from the spirit and scope of the appending claims.

I claim:

1. A fluid valve for disposition in a valve body having a fluid inlet and outlet comprising means forming a piston passage and a spaced first seat and a second running seat, said seats being between said inlet and outlet; first and second spaced pistons connected therebetween by a conduit to form in cooperation with said means a main fluid chamber between said pistons and a first piston chamber forward of said first piston and a second piston chamber rearward of said second piston, said first piston chamber communicating with said main chamber when said first piston is unseated, said conduit having a passageway communicating said first and second piston chambers, said pistons being slidably disposed within said piston passage for axial movement toward said first piston chamber and being adapted so said first piston and said first seat and said second piston and said second running seat, respectively, sealingly engage; a metering orifice in said second piston communicating said main fluid chamber with said second piston chamber; means loosely within said metering orifice and having a portion thereof extending into said main fluid chamber adapted to be contacted and rotated by fluid passing through said main fluid chamber; a valve structure disposed entirely within said passageway in fluid blocking relation and having an opening means extending into said second piston chamber and being adapted to be actuated by an actuating means; and an actuating means disposed in said second piston chamber and adapted to protrude in fluid-tight relationship from said valve body and to actuate said opening means upon actuation and to unseat said first piston from said first seat.

3. A valve in accordance with claim 2 wherein said means forming said first piston chamber has a cross-sectional area less than said valve body and means to sealingly engage said valve body to isolate said first piston chamber from said main fluid chamber when said first piston is seated.

3. A valve in accordance with claim 2 wherein said first and second pistons have resilient material therearound adapted to form a fluid-tight seal with said first seat and said second running seat respectively.

4. A valve in accordance with claim 3 wherein said first seat and said first piston coact to provide an unbalanced flow condition to allow limited flow therethrough when said first piston moves toward sealing engagement with said first seat.

5. A valve in accordance with claim 4 wherein said first seat has an uneven surface upon which said first piston seats.

6. A valve in accordance with claim 5 wherein said uneven surface is provided by a recess in the surface of said seat.

7. A valve in accordance with claim 6 wherein said means in said metering orifice is a pin having a bent portion thereof extending into said main fluid chamber, the other portion being straight and extending into said second piston chamber; and a helical spring encircles said straight portion in movable relationship therewith, said spring being retained in encircling engagement with said straight portion.

8. A valve in accordance with claim 7 wherein a spring encircles said conduit between said pistons and biases said first piston into sealing engagement with said first seat.

9. A valve in accordance with claim 8 in which said means forming said piston passage is a first open-sided, open-ended cylinder and collar forming said first piston chamber and seat respectively and a second closed-sided, open-ended cylinder forming said second piston chamber and second running seat, said second cylinder having an interior flange to limit the movement of said second piston therethrough.

10. A valve in accordance with claim 9 wherein said first and second pistons are annular and have annular grooves in which resilient O-rings are disposed to provide fluid-tight seals with said first seat and to provide a fluid-tight seal between said second piston and said closed-sided cylinder.

11. A valve in accordance with claim 10 wherein means join said first open-sided and second closed-sided cylinders thereby forming said main fluid chamber and providing a piston passage of unitary construction insertable in said valve body along with said connected first and second pistons as an integral unit.

12. A valve in accordance with claim 11 wherein said pistons, conduit and cylinders are of molded plastic.

13. A valve in accordance with claim 12 wherein said pistons are cylindrically shaped and said second piston has a recessed surface facing said second piston chamber with a plurality of webs disposed within said recess to impart turbulence to fluid entering said second piston chamber.

14. A valve in accordance with claim 13 wherein said second piston has a larger cross-sectional area than said first piston.

15. A valve in accordance with claim 14 wherein said valve body has a threaded inlet end adapted to be threadedly connected to a water supply source and said actuator means is axially shiftable to axially displace said integral unit within said valve body and to maintain a plurality of water-tight engagements depending on thread advancement between said valve body and water source and said valve body and actuator means.

16. A valve in accordance with claim 1, wherein said means in said metering orifice is a pin having a bent portion thereof extending into said main fluid chamber, the other portion being straight and extending into said second piston chamber; and a helical spring encircles said straight portion in movable relationship therewith, said spring being retained in encircling engagement with said straight portion.

References Cited
UNITED STATES PATENTS

| | | | |
|---|---|---|---|
| 685,931 | 11/1901 | Nethery | 251—39 |
| 1,242,200 | 10/1917 | Keating | 251—38 |
| 2,492,436 | 12/1949 | Owens | 251—38 X |
| 2,914,293 | 11/1959 | Harrell | 251—43 X |
| 3,187,775 | 6/1965 | Pinnell | 251—122 X |
| 1,647,189 | 11/1927 | Mueller et al. | 137—245 |
| 1,808,989 | 6/1931 | Langdon | 137—245 X |

ARNOLD ROSENTHAL, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,731 September 10, 1968

Robert R. McCornack

It is certified that error appears in the above identified patent and that said Letters Patent are hereby corrected as shown below:

Column 9, line 6, "3. A valve in accordance with claim 2 wherein said" should read -- 2. A valve in accordance with claim 1 wherein said --.

Signed and sealed this 20th day of January 1970.

(SEAL)
Attest:

Edward M. Fletcher, Jr.
Attesting Officer

WILLIAM E. SCHUYLER, JR.
Commissioner of Patents